US012204590B2

(12) United States Patent
Yan et al.

(10) Patent No.: US 12,204,590 B2
(45) Date of Patent: Jan. 21, 2025

(54) OBTAINING TARGET INFORMATION FOR A REQUEST FROM A SHARED PARAMETER LIST

(71) Applicant: Huawei Technologies Co., Ltd., Shenzhen (CN)

(72) Inventors: Zhefeng Yan, Shenzhen (CN); Lifeng Shang, Hong Kong (CN); Tao Cai, Hong Kong (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 435 days.

(21) Appl. No.: 16/868,970

(22) Filed: May 7, 2020

(65) Prior Publication Data

US 2020/0264923 A1  Aug. 20, 2020

Related U.S. Application Data

(63) Continuation of application No. PCT/CN2018/122196, filed on Dec. 19, 2018.

(30) Foreign Application Priority Data

Apr. 26, 2018  (CN) .......................... 201810388248.8

(51) Int. Cl.
*G06F 16/9035* (2019.01)
*G06F 9/48* (2006.01)
(52) U.S. Cl.
CPC ........ *G06F 16/9035* (2019.01); *G06F 9/4881* (2013.01); *G06F 2209/486* (2013.01)
(58) Field of Classification Search
None
See application file for complete search history.

(56) References Cited

U.S. PATENT DOCUMENTS

2012/0253791 A1* 10/2012 Heck ................... G06F 16/9535
704/9
2012/0265528 A1* 10/2012 Gruber .................... G10L 15/18
704/235
2013/0166590 A1   6/2013 Kim
2013/0311997 A1* 11/2013 Gruber ...................... G06F 9/46
718/102

(Continued)

FOREIGN PATENT DOCUMENTS

CN    103870476 A    6/2014
CN    104281698 A    1/2015

(Continued)

OTHER PUBLICATIONS

Xiangfu, M., et al. "Web Database top-k Diverse Keyword Query Suggestion Approach," Journal of Computer Research and Development, Jul. 2017, 15 pages. With English abstract.

(Continued)

*Primary Examiner* — Neveen Abel Jalil
*Assistant Examiner* — John J Morris
(74) *Attorney, Agent, or Firm* — Conley Rose, P.C.

(57) ABSTRACT

An information processing method includes receiving first request information entered by a user, determining a first task engine for the first request information, where a first slot is set in the first task engine, extracting key information from the first request information based on the first slot, and if the key information fails to be extracted from the first request information based on the first slot, or if the key information is extracted from the first request information based on the first slot, but the extracted key information does not meet a condition, obtaining target key information from a shared parameter list of the user.

20 Claims, 11 Drawing Sheets

(56) References Cited

U.S. PATENT DOCUMENTS

| | | | |
|---|---|---|---|
| 2014/0040748 A1* | 2/2014 | Lemay | G06F 3/04817 |
| | | | 715/728 |
| 2014/0280292 A1* | 9/2014 | Skinder | G06F 16/24534 |
| | | | 707/767 |
| 2016/0042735 A1* | 2/2016 | Vibbert | G10L 15/1822 |
| | | | 704/257 |
| 2016/0132605 A1* | 5/2016 | Jiang | G06F 16/2457 |
| | | | 707/728 |
| 2016/0259775 A1* | 9/2016 | Gelfenbeyn | G06F 40/35 |
| 2018/0004729 A1 | 1/2018 | Qiu et al. | |
| 2018/0365257 A1 | 12/2018 | Chen et al. | |
| 2019/0005948 A1 | 1/2019 | Gao et al. | |

FOREIGN PATENT DOCUMENTS

| | | |
|---|---|---|
| CN | 105068661 A | 11/2015 |
| CN | 105159996 A | 12/2015 |
| CN | 105183850 A | 12/2015 |
| CN | 106202127 A | 12/2016 |
| CN | 107256267 A | 10/2017 |
| CN | 107301227 A | 10/2017 |
| CN | 107369443 A | 11/2017 |
| CN | 107807933 A | 3/2018 |
| CN | 109948017 A | 6/2019 |
| EP | 3200185 A1 | 8/2017 |
| JP | 2001356796 A | 12/2001 |
| KR | 20120023266 A | 3/2012 |
| WO | 2018000278 A1 | 1/2018 |

OTHER PUBLICATIONS

Xu, D., et al. "A New Question Sentence Recommendation Method Based on User Interests and Needs," Computer Applications and Software, Aug. 2016, 4 pages. With English abstract.

* cited by examiner

| Shared parameter list | | | | | | |
|---|---|---|---|---|---|---|
| Air ticket booking task engine | | | Train ticket booking task engine | | Hotel reservation task engine | |
| User A | <Air ticket booking>: Destination | Shanghai | User A | <Train ticket booking>: Destination | Shanghai | User A | <Hotel reservation>: Residence | Shanghai |
| User A | <Air ticket booking>: Departure place | Beijing | User A | <Train ticket booking>: Departure place | Beijing | User A | <Hotel reservation>: Days | Three days |
| User A | <Air ticket booking>: Time | Today | User A | <Train ticket booking>: Time | Today | User A | <Hotel reservation>: Time | Today |

FIG. 6

| Shared parameter list |||
|---|---|---|
| User A | <Air ticket booking>: Destination | Shanghai |
| User A | <Air ticket booking>: Departure place | Beijing |
| User A | <Air ticket booking>: Time | Today |

FIG. 7

OBTAINING TARGET INFORMATION FOR A REQUEST FROM A SHARED PARAMETER LIST

CROSS-REFERENCE TO RELATED APPLICATIONS

This application is a continuation of International Patent Application No. PCT/CN2018/122196, filed on Dec. 19, 2018, which claims priority to Chinese Patent Application No. 201810388248.8, filed on Apr. 26, 2018. The disclosures of the aforementioned applications are hereby incorporated by reference in their entireties.

TECHNICAL FIELD

This application relates to the field of computer technologies, and in particular, to an information processing method and apparatus.

BACKGROUND

With rapid development of the Internet, a human-computer interaction system is increasingly widely used. Input of the human-computer interaction system may be a request such as a weather query, air ticket booking, encyclopedic knowledge, and a chat. The human-computer interaction system may feed back, based on a request of a user, information that meets a user requirement. For example, the request entered by the user may be "weather conditions of Beijing tomorrow", and the information fed back by the human-computer interaction system to the user may be "weather of Beijing tomorrow is sunny to cloudy".

In some approaches, the human-computer interaction system needs to obtain key information that meets a condition from request information of the user. If the key information that meets the condition fails to be obtained from the request information of the user, the human-computer interaction system feeds back, to the user, information indicating that processing fails, and consequently user experience is relatively poor and human-computer interaction efficiency is low.

SUMMARY

This application provides an information processing method and apparatus, to achieve relatively good user experience and relatively high human-computer interaction efficiency.

According to a first aspect, this application provides an information processing method, including receiving first request information entered by a user, determining a first task engine for the first request information, where a first slot is set in the first task engine, extracting key information from the first request information based on the first slot, and if the key information fails to be extracted from the first request information based on the first slot, or if the key information is extracted from the first request information based on the first slot, but the extracted key information does not meet a condition, obtaining target key information from a shared parameter list of the user, where the shared parameter list includes at least a correspondence between a second slot and the target key information, the second slot and the first slot have a same slot type, the second slot is a slot in the second task engine, and the first task engine is different from the second task engine.

In this embodiment of this application, if the key information fails to be extracted for the first slot, or if the extracted key information does not meet the condition, the target key information is obtained from the shared parameter list of the user. Compared with another solution in which when the key information fails to be extracted or the extracted key information does not meet the condition, information indicating that processing fails is fed back such that the user enters a request again, better user experience and higher human-computer interaction efficiency can be achieved.

In a possible implementation, the shared parameter list includes a correspondence between the first task engine and one or more task engines, a correspondence between slots included in any two task engines that have a correspondence, and the correspondence between the second slot and the target key information, where the one or more task engines include the second task engine.

The following manner may be used to obtain the target key information from the shared parameter list of the user determining the second task engine based on the correspondence between the first task engine and the one or more task engines, determining, based on the correspondence between slots and from slots that are included in the second task engine and that are included in the shared parameter list, the second slot that has a correspondence with the first slot of the first task engine, and determining the target key information based on the correspondence between the second slot and the target key information.

Optionally, the second task engine is configured for second request information of the user, where the second request information and the first request information occur within a preset time, and the second request information and the first request information occur within a preset quantity of dialogue rounds. One round of dialogue may refer to a process in which the user enters a piece of request information and a human-computer interaction system feeds back a piece of information.

In this embodiment of this application, the second task engine is determined with reference to the shared parameter list and an occurrence time of request information such that the second task engine can be located accurately, and accuracy of the target key information filled in the second slot is improved.

In a possible implementation, a correspondence between a second slot and the target key information is stored in the shared parameter list. The following manner may be used to obtain the target key information from the shared parameter list of the user determining, using a context parameter of the user, the second task engine that is adjacent to the first task engine in terms of time, determining, from slots of the second task engine, the second slot having the same type as the first slot, and determining the target key information based on the correspondence between the second slot and the target key information. The second task engine is configured for the second request information of the user, a slot having the same type as the first slot is set in the second task engine, and the adjacency of time means that an occurrence time of the second request information is adjacent to an occurrence time of the first request information. In a possible implementation, when the second slot having the same type as the first slot is being determined, if there are two or more slots having the same type as the first slot type, the second slot may be selected based on preset priority information.

In this embodiment of this application, only one correspondence is stored in the shared parameter list, that is, a correspondence between different slots of a task engine and target key information. Compared with the foregoing implementation of the shared parameter list (three correspondences needs to be stored in the foregoing shared parameter list), the manner of this application can reduce a data amount of information stored in the shared parameter list, and improve a rate for accessing the shared parameter list.

In a possible implementation, the shared parameter list is a shared parameter list exclusively occupied by the second task engine, and the shared parameter list exclusively occupied by the second task engine may include the correspondence between the second slot and the target key information. The following manner may be used to obtain the target key information in the shared parameter list of the user determining the second task engine based on a correlation between the first task engine and the second task engine, where the correlation between the first task engine and the second task engine is greater than a preset threshold, determining, based on the second task engine, the shared parameter list exclusively occupied by the second task engine, searching the shared parameter list exclusively occupied by the second task engine for a slot that has the same slot type as the first slot, and using the slot as the second slot, and determining the target key information based on the correspondence between the second slot and the target key information.

In this embodiment of this application, each task engine of the human-computer interaction system maintains one shared parameter list, and a correspondence between a slot of the task engine and target key information is stored in the shared parameter list. Compared with the foregoing two shared parameter lists, where three correspondences are maintained in one list, and a correspondence between slots of a plurality of task engines and target key information is stored in another list, using the shared parameter list of this application can further reduce the data amount of the information stored in the shared parameter list, and further improve the rate of accessing the shared parameter list.

In this embodiment of this application, the key information that does not meet the condition includes demonstrative information. In the correspondence between the second slot and the target key information included in the shared parameter list, the target key information corresponding to the second slot is unique, and the key information corresponding to the second slot is updatable.

In a possible implementation, the following manner may be used to update the target key information corresponding to the second slot. The manner is as follows receiving third request information entered by the user, where the second task engine is configured for the third request information, extracting, from the third request information, key information corresponding to the second slot of the second task engine, and updating, based on the key information corresponding to the second slot that is extracted from the third request information, the target key information corresponding to the second slot in the correspondence between the second slot and the target key information included in the shared parameter list.

In this embodiment of this application, a plurality of slots may be set in the first task engine. The following manner may be used to determine the first slot in the plurality of slots, and is determining the plurality of slots set in the first task engine, where the plurality of slots have priority information, and determining the first slot based on the priority information of the plurality of slots.

In an example of this application, the slot type may be a time, a place, a behavior, a character, or the like.

In a possible implementation, the shared parameter list may be stored at a local end, for example, stored in a memory in the information processing apparatus, or may be obtained from an external storage device through a communications network or an access interface.

According to a second aspect, this application provides an information processing apparatus, used for a terminal device or a server. The information processing apparatus includes a unit or a means configured to perform steps in the first aspect.

According to a third aspect, this application provides an information processing apparatus, used for a terminal device or a server. The information processing apparatus includes at least one processing element and at least one storage element. The at least one storage element is configured to store a program and data, and the at least one processing element is configured to perform the method provided in the first aspect of this application.

According to a fourth aspect, this application provides a computer-readable storage medium. The computer-readable storage medium stores an instruction, and when the instruction is run on a computer, the computer is enabled to perform the method according to the first aspect.

According to a fifth aspect, this application provides a computer program, where the computer program includes a computer instruction, and when the computer instruction is executed by a computer, the computer is enabled to perform the method according to the first aspect.

According to a sixth aspect, this application provides a human-computer interaction system, including a central control module and a task engine module. The central control module is implemented by an information processing apparatus provided in this application, and the engine module is configured to implement functions of a first task engine and a second task engine. In a possible implementation, the human-computer interaction system further includes a multi-task parameter sharing management module, and the shared parameter list may be stored in the shared parameter management module.

BRIEF DESCRIPTION OF DRAWINGS

FIG. 6 is another schematic diagram of a shared parameter list according to this application.

FIG. 7 is still another schematic diagram of a shared parameter list according to this application.

DESCRIPTION OF EMBODIMENTS

Figure 1:
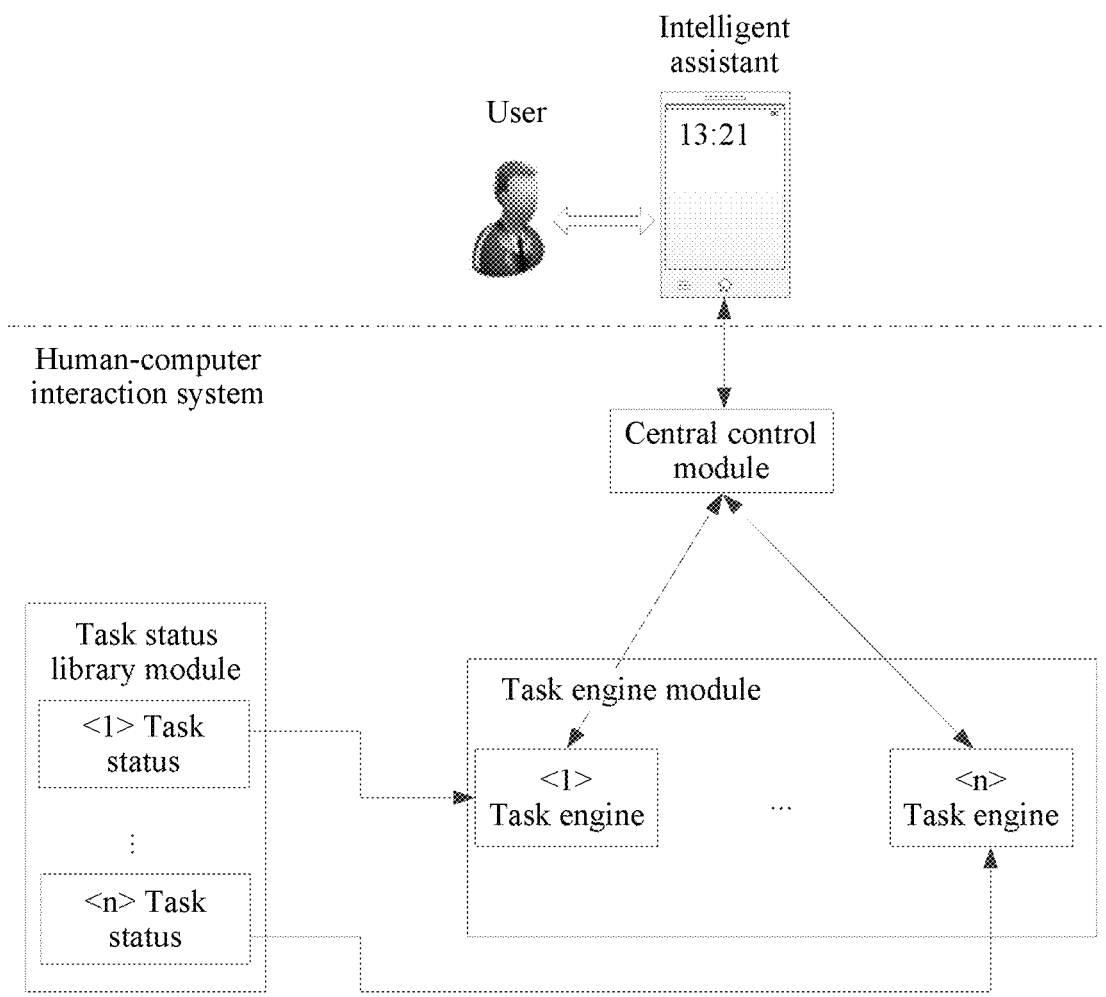
FIG. 1 is a human-computer interaction system according to this application.

As shown in FIG. 1, this application provides a human-computer interaction system. The human-computer interaction system mainly includes a central control module and a task engine module. The human-computer interaction system may further include a task status library module.

The central control module is mainly responsible for distributing session requests to one or more related task engine modules, and then performing summarizing and making a decision based on results returned by a plurality of task engine modules to obtain a final result.

The task engine module includes a plurality of task engines. Each task engine is mainly configured to be responsible for a session service in a specific field, for example, parsing request information entered by a user in order to obtain key information that meets a condition. For example, for an air ticket booking task engine, key information that meets an air ticket booking task, such as departure place information, destination information, and time information, may be extracted from request information entered by the user.

The task status library module is mainly configured to store an intermediate state of a user session task.

In this application, after the task engine module obtains the key information that meets the condition, the task engine module may execute a corresponding task based on the key information, or the central control module may execute a corresponding task based on the key information, or an intelligent terminal may execute a corresponding task based on the key information, or a new module may be developed in the human-computer interaction system, and is configured to execute a corresponding task based on the key information. In this application, an entity for executing the corresponding task based on the key information is not limited.

It should be noted that a function of the human-computer interaction system may be implemented by a server, by a terminal device, or jointly by the server and the terminal device.

Therefore, that the human-computer interaction system mainly includes a central control module and a task engine module may be understood as, when the function of the human-computer interaction system is implemented by the server, the server includes the central control module and the task engine module, or when the function of the human-computer interaction system is implemented by the terminal device, the terminal device includes the central control module and the task engine module.

In an example of this application, an example in which "after obtaining the key information that meets the condition, the task engine module sends the key information to the central control module, and the central control module executes the corresponding task" is used to detail a working process of the entire human-computer interaction system.

The user enters request information to an intelligent terminal, where the request information may be voice information, text information, or image information. The intelligent terminal forwards the request information of the user to the central control module of the human-computer interaction system. The central control module forwards the request information of the user to one or more task engines in the task engine module. The task engine may parse the request information, obtain key information that meets a condition, and send the key information that meets the condition to the central control module. The central control module may execute a corresponding task based on the key information fed back by the task engine module. In addition, the task engine may store a corresponding parsing result in a corresponding task status in the task status library module.

For example, a user A enters a request that "I want to book an air ticket from Beijing to Shanghai tomorrow" to the intelligent terminal, and in this case, the intelligent terminal may send the request that "The user A wants to book an air ticket from Beijing to Shanghai tomorrow" to the central control module. The central control module may first determine that the request should be handled by the "air ticket booking task engine", and then send the request that "The user A wants to book an air ticket from Beijing to Shanghai tomorrow" to the air ticket booking task engine in the task engine module. The air ticket booking task engine may parse the request information that "The user A wants to book an air ticket from Beijing to Shanghai tomorrow" to obtain the following key information that meets a condition {intention="air ticket booking", time="tomorrow", departure place="Beijing", and destination="Shanghai"}, and then the "air ticket booking task engine" may feed back the key information to the central control module. The central control module may book, for the user A, "an air ticket from Beijing to Shanghai tomorrow" based on the key information fed back by the "air ticket booking task engine", finally generate feedback information of a processing result "the air ticket from Beijing to Shanghai tomorrow has been booked for you, and booking information is * * * *", and send the feedback information to the intelligent terminal. The intelligent terminal may display the feedback information to the user using a text, a voice, an image, or the like.

It can be learned from the foregoing analysis that, in the human-computer interaction system shown in FIG. 1, when a task request of the user is being handled, key information that meets a task execution condition needs to be obtained such that the task request of the user can be handled. For example, for a request of an air ticket booking task, key information such as "a time, a departure place, and a destination" that meets the air ticket booking task needs to be obtained such that an air ticket can be booked for the user based on the task request of the user. For a request of a weather query task, key information such as "location and time" that meets the weather query task needs to be obtained in order to query the weather for the user. If key information fails to be extracted from a task request, or if key information can be extracted from a task request, but the extracted key information does not meet a condition, the human-computer interaction system feeds back a prompt such as "processing fails, please enter information again", and the user needs to enter request information again. Consequently, human-computer interaction efficiency is low. For example, if the user first enters request information that "I want to book an air ticket from Beijing to Shanghai tomorrow", and then enters request information that "How is the weather over there?", because when the request information that "How is the weather over there" is being handled, key information such as weather and a place that meet the weather query task fails to be extracted, the human-computer interaction system feeds back "Which city do you want to ask about the weather". Consequently, user experience is poor, and human-computer interaction efficiency is low.

Figure 2:
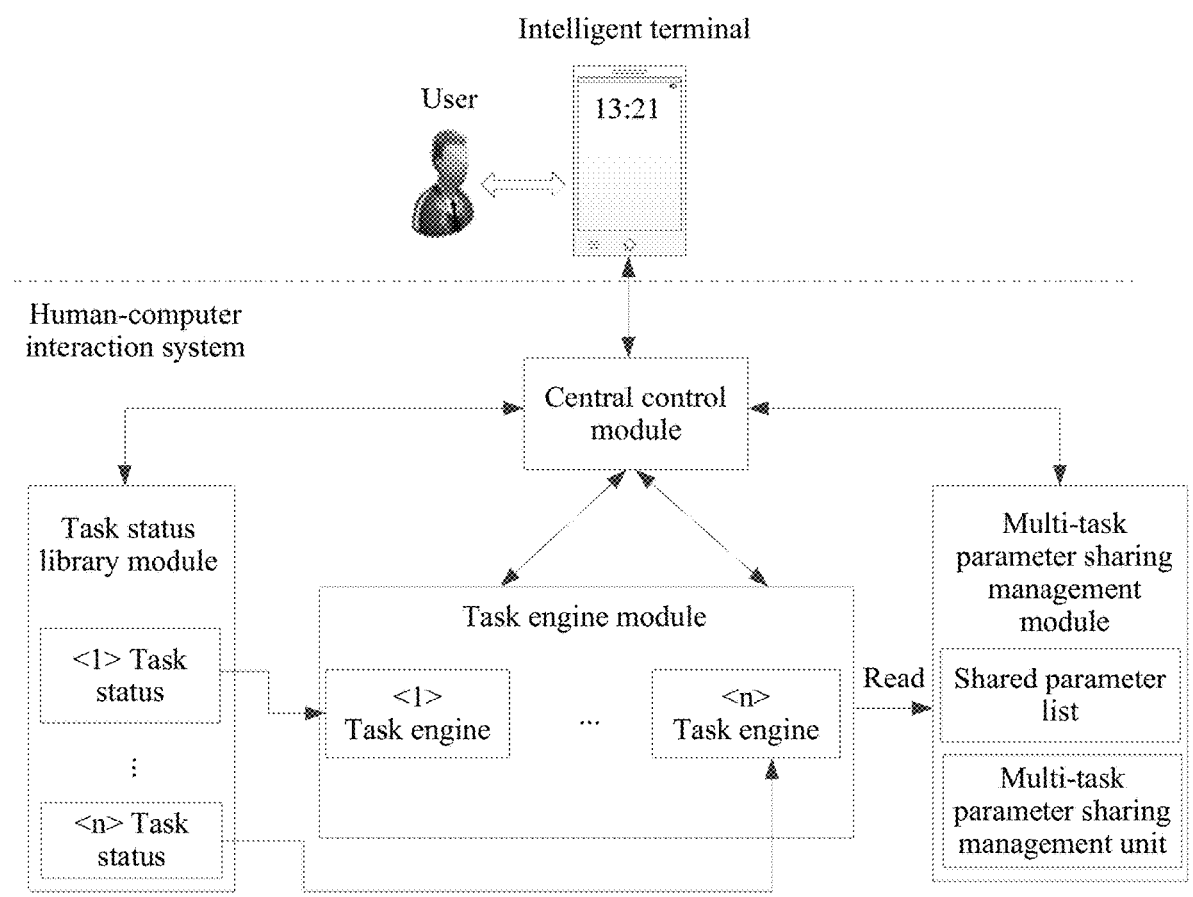
FIG. 2 is another human-computer interaction system according to this application.

Based on the foregoing scenario, as shown in FIG. 2, this application provides a human-computer interaction system, including at least a central control module, a task engine module, and a multi-task parameter sharing management module. Optionally, the system may further include a task status library module.

For corresponding functions of the central control module, the task engine module, and the task status library module, refer to records shown in FIG. 1. Details are not described herein again.

The multi-task parameter sharing management module may store a shared parameter list. There may be one shared parameter list, and n task engines in the human-computer interaction system may share the shared parameter list. Alternatively, there may be a plurality of shared parameter lists, and each task engine in the human-computer interaction system exclusively occupies one shared parameter list. For example, the entire human-computer interaction system includes the n task engines. In this case, the multi-task parameter sharing management module may include n shared parameter lists, and each task engine in the n task engines exclusively occupies one shared parameter list in the n shared parameter lists.

Optionally, the multi-task parameter sharing management module may further include a multi-task parameter sharing management unit configured to manage the shared parameter list.

In this embodiment of this application, the shared parameter list may be generated based on a historical dialogue parameter of a user. In this embodiment of this application, when the task engine module fails to extract key information from request information entered by the user, or when the task engine module can extract key information but the extracted key information does not meet a condition, the task engine module may obtain target key information that meets the condition from the shared parameter list. The user does not need to enter request information repeatedly such that user experience is relatively good, and human-computer interaction efficiency is effectively improved.

Figure 3:
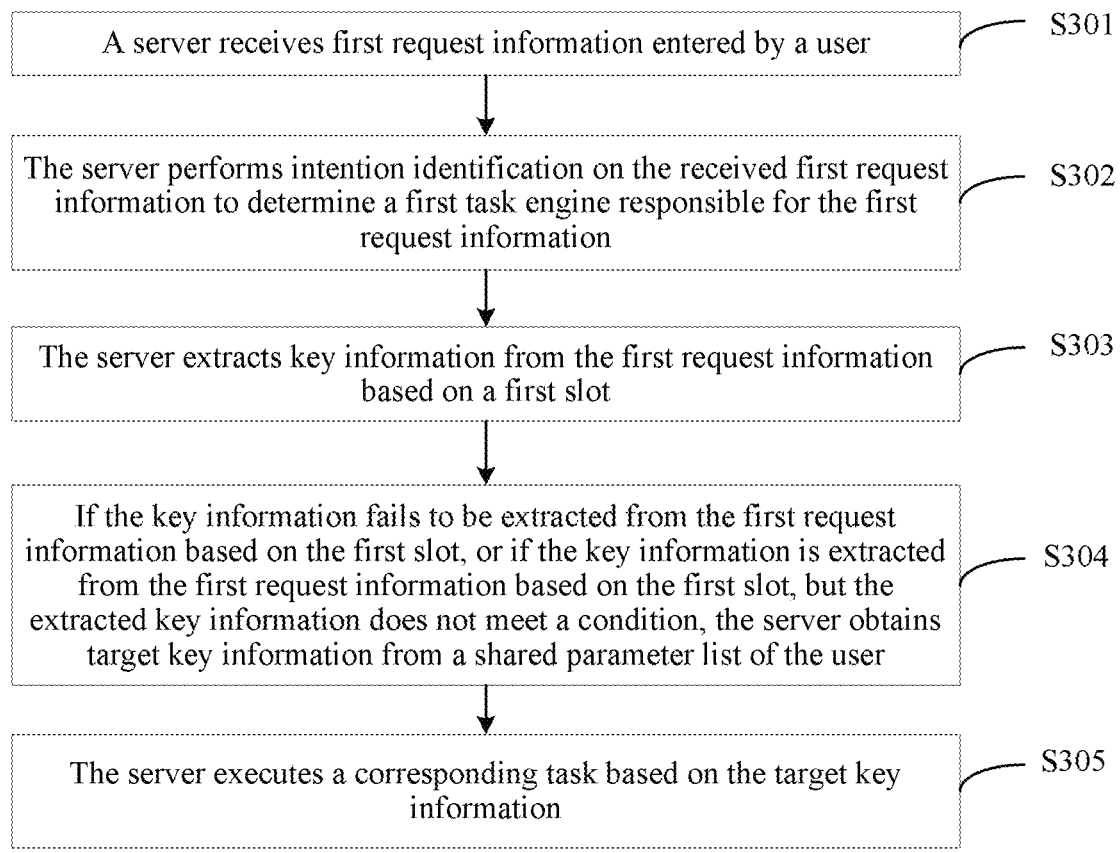
FIG. 3 shows an information processing procedure according to this application.

Based on the human-computer interaction system shown in FIG. 2, this application provides an information processing method. The method may be executed by the intelligent terminal shown in FIG. 1 or FIG. 2 or the server in which the human-computer interaction system shown in FIG. 1 or FIG. 2 is run, where the server may be but is not limited to a cloud server. In this embodiment of this application, that a server in which the human-computer interaction system is run is an execution body is used as an example, as shown in FIG. 3, to detail a procedure of the information processing method.

Step S301. The server receives first request information entered by a user.

In this embodiment of this application, the first request information may be voice information, text information, image information, or the like. The user may enter the first request information to an intelligent terminal, and the intelligent terminal may forward the first request information to the server.

Step S302. The server performs intention identification on the received first request information to determine a first task engine responsible for the first request information.

In this embodiment of this application, a central control module in the server may perform intention identification on the first request information, and determine, based on an intention identification result, the first task engine responsible for the first request information. For example, the central control module determines that the intention identification result of the first request information is air ticket booking, and in this case, the central control module may determine that the first task engine responsible for the first request information is an air ticket booking task engine.

In this embodiment of this application, different slots (slot) may be set in each task engine, the slot may be a variable, and a value (slot view) of the slot may be key information corresponding to the slot. In this embodiment of this application, the slot may also be referred to as an information slot, and the key information corresponding to the slot may also be referred to as slot information. In this embodiment of this application, that a first slot is set in the first task engine is used as an example to detail a process of this application. It should be noted that, in this embodiment of this application, terms such as "first" and "second" in the first task engine, the second task engine, the first slot, and the second slot are only used to distinguish between descriptions, and shall not be understood as an indication or implication of relative importance or indication or implication of an order.

Step S303. The server extracts key information from the first request information based on the first slot.

For example, the first task engine is an "air ticket booking task engine", and the first slot is a "departure place slot". In this case, the server may extract, from the first request information, key information corresponding to the "departure place slot". For another example, the first slot is a "destination slot". In this case, the server may extract, from the first request information, key information corresponding to the "destination slot".

Step S304. If the key information fails to be extracted from the first request information based on the first slot, or if the key information is extracted from the first request information based on the first slot, but the extracted key information does not meet a condition, the server obtains target key information from a shared parameter list of the user.

The shared parameter list includes at least a correspondence between the second slot and the target key information, the second slot and the first slot have a same slot type, and the slot type is a time, a location, a behavior, a character, or the like. The second slot is a slot in the second task engine, and the first task engine is different from the second task engine. The key information that does not meet the condition may be demonstrative information, where the demonstrative information may be a demonstrative word extracted from the first request information, and the demonstrative word may be, for example, "this", "that", "here", and "there".

Step S305. The server executes a corresponding task based on the target key information.

It can be learned from the foregoing that, in this embodiment of this application, when the key information fails to be extracted from the first request information entered by the user, or when the key information can be extracted, but the extracted key information does not meet the condition, the server may obtain the target key information from the shared parameter list of the user, and execute the corresponding task based on the target key information. Compared with the foregoing solution shown in FIG. 1 in which when the key information fails to be extracted, or the extracted key information does not meet the condition, the user is requested to enter request information again, using the solution in this application can achieve better user experience and higher human-computer interaction efficiency.

In an example of this application, a plurality of slots may be set in the first task engine, all the slots have a same priority, and key information corresponding to each slot may be filled in any order. For example, a "departure place slot", a "destination slot", and a "time slot" are set in the first task engine, and the key information corresponding to each slot may be successively filled in an order of the "departure place slot", the "destination slot", and the "time slot". Alternatively, the key information corresponding to each slot may be successively filled in an order of the "time slot", the "destination slot", and the "departure place slot".

In another example of this application, a plurality of slots may be set in the first task engine, and each slot has a different priority. Key information corresponding to each slot may be filled according to priorities of the slots. For example, an air ticket booking task engine includes three slots, which are respectively a "departure place slot", a "destination slot", and a "time slot". In addition, a priority of the "time slot" is set to be the highest, a priority of the "departure place slot" is set to be the second highest, and a priority of the "destination slot" is set to be the lowest. In this case, key information corresponding to the "time slot" may be first filled, key information corresponding to the "departure place slot" is then filled, and key information corresponding to the "destination slot" is finally filled.

In this embodiment of this application, a process of filling the key information corresponding to each slot is detailed using the first slot as an example. First, the key information corresponding to the first slot is extracted from the request information entered by the user. If the key information can be extracted, and the extracted key information meets the condition, filling of the first slot is completed. If the key information fails to be extracted from the request information, or if the key information can be extracted, but the extracted key information does not meet the condition, the target key information is obtained from the shared parameter list of the user, and the target key information is used as the key information corresponding to the first slot.

Optionally, the procedure shown in FIG. 3 may further include updating, by the server, the shared parameter list of the user based on a semantic identification result of each task engine, where the semantic identification result includes intention information and key information that meets the condition.

For example, if a first request entered by a user A is "booking an air ticket from Beijing to Shanghai tomorrow", a semantic identification result obtained by the air ticket booking task engine may be {intention="air ticket booking", time="tomorrow", departure place="Beijing", and destination="Shanghai"}. Intention information is {intention="air ticket booking"}, and key information that meets the condition is {time="tomorrow", departure place="Beijing", and destination="Shanghai"}.

In this embodiment of this application, when the first request information corresponds to not only the first task engine, but also N other task engines, for example, the user enters first request information of "booking a ticket from Beijing to Shanghai tomorrow", the central control module of the human-computer interaction system performs intention identification on the first request information entered by the user, and finds that the first request information corresponds to "ticket booking". However, the entire human-computer interaction system includes the "air ticket booking task engine", a "train ticket booking task engine", and a "bus ticket booking task engine". In this case, the central control module may separately send the first request information to the "train ticket booking task engine", the "bus ticket booking task engine", and the "air ticket booking task engine". The first request information may be referred to as corresponding to the foregoing three task engines the "train ticket booking task engine", the "bus ticket booking task engine", and the "air ticket booking task engine".

In this embodiment of this application, when the first task request corresponds to N+1 task engines, and the N+1 task engines include the first task engine and the foregoing other N task engines, the N+1 task engines may send semantic identification results of the N+1 task engines for the first request information to the central control module, and the central control module may select, from the N+1 semantic identification results, a semantic identification result that meets a rule, for example, an optimal semantic identification result, to update the shared parameter list of the user.

Figure 4A:
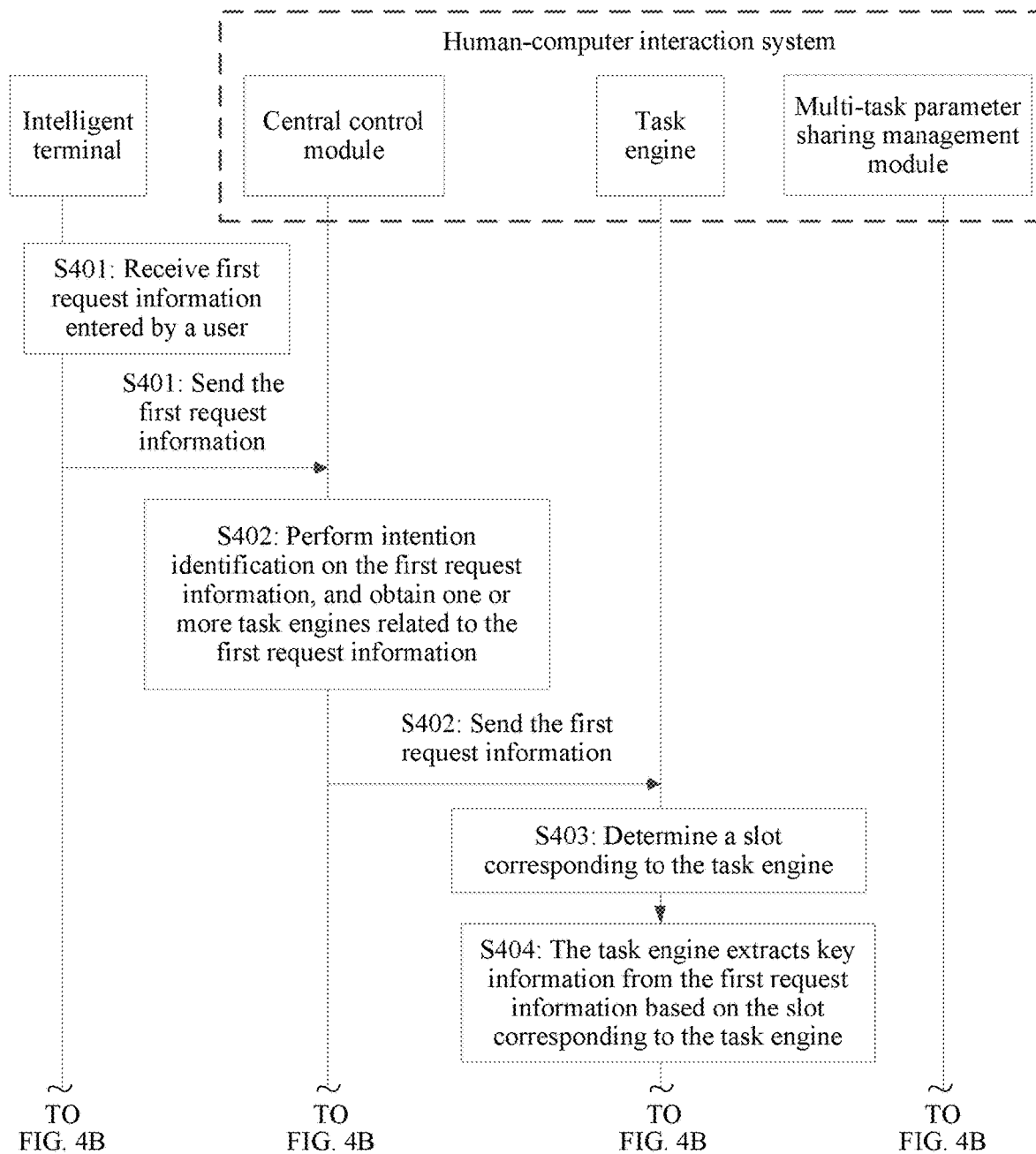
FIG. 4A shows another information processing procedure according to this application.
Figure 4B:
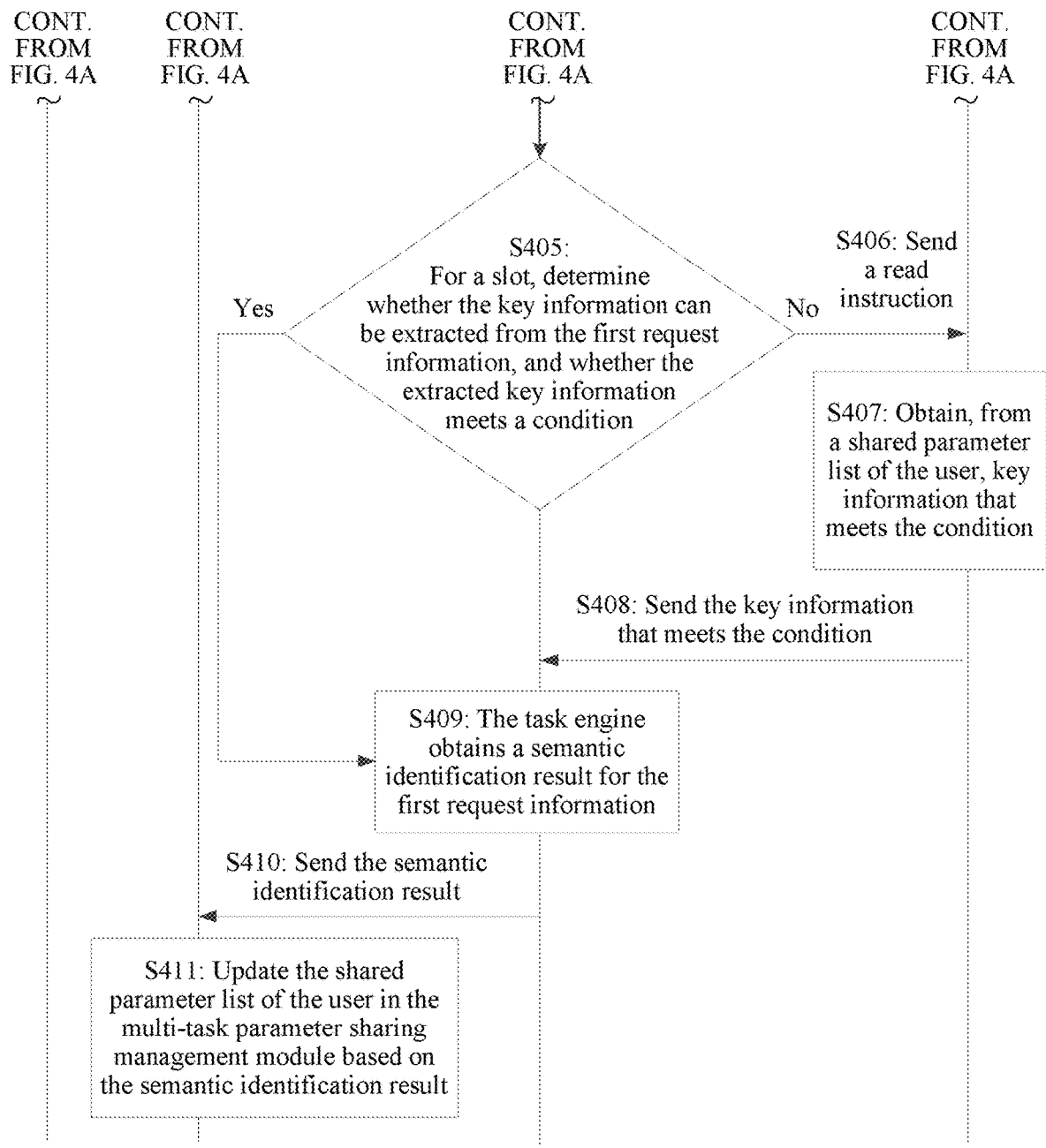
FIG. 4B shows another information processing procedure according to this application.

As shown in FIG. 4A and FIG. 4B, in an example of this application, an example in which the foregoing server shown in FIG. 3 includes a central control module, a task engine module, and a multi-task parameter sharing management module is used to detail the information processing procedure shown in FIG. 3.

Step S401. An intelligent terminal receives first request information entered by a user, and sends the first request information to the central control module of a human-computer interaction system.

Step S402. The central control module performs intention identification on the first request information, obtains one or more task engines related to the first request information, and sends the first request information to the one or more task engines in the task engine module.

Step S403. A task engine determines a slot corresponding to the task engine.

Different task engines may correspond to different slots. For example, a slot corresponding to an air ticket booking task engine may be a "departure place slot", a "destination slot", or a "place slot". A slot corresponding to a weather query task engine may be a "place slot" or a "time slot".

Step S404. The task engine extracts key information from the first request information based on the slot corresponding to the task engine.

For example, for the weather query task engine, slots corresponding to the weather query task engine may include the "place slot" and the "time slot". The weather query task engine may successively extract, from the first request information entered by the user, key information corresponding to the "place slot" and the "time slot". For another example, the first request information entered by the user may be "query weather conditions of Beijing tomorrow", and the weather query task engine may successively extract, from the foregoing first request information, key information "Beijing" corresponding to the "place slot" and key information "tomorrow" corresponding to the "time slot".

Step S405. For a slot, if key information can be extracted from the first request information, and the extracted key information meets a condition, step S409 is performed, otherwise, step S406 is performed.

Step S406. The task engine sends a read instruction to the multi-task parameter sharing management module.

Step S407. The multi-task parameter sharing management module obtains target key information from a shared parameter list of the user.

Step S408. The multi-task parameter sharing management module sends the target key information to the task engine.

Step S409. The task engine obtains a semantic identification result for the first request information.

The semantic identification result includes intention information for the first request information and the key information that meets the condition.

Step S410. The task engine sends the semantic identification result for the first request information to the central control module.

Step S411. The central control module updates the shared parameter list of the user in the multi-task parameter sharing management module based on the semantic identification result sent by the task engine.

It should be noted that in the foregoing procedure shown in FIG. 4A and FIG. 4B, an example in which the task engine module reads information from the shared parameter list, and the central control module updates the shared parameter list is used for description. In this embodiment of this application, an entity for reading information from the shared parameter list and an entity for updating the shared parameter list are not limited. For example, in this application, the central control module may be responsible for reading information from the shared parameter list and updating the shared parameter list. Alternatively, the task engine module is responsible for reading information from the shared parameter list and updating the shared parameter list. Alternatively, the central control module is responsible for reading information from the shared parameter list, and the task engine module is responsible for updating the shared parameter list. Alternatively, the task engine module is responsible for reading information from the shared parameter list, and the central control module is responsible for updating the shared parameter list.

This embodiment of this application gives a detailed description of "how to obtain the target key information based on the shared parameter list of the user" in the foregoing procedure shown in FIG. 3 or FIG. 4A and FIG. 4B.

This embodiment of this application provides two types of shared parameter lists a first type of shared parameter list and a second type of shared parameter list. The target key information may be obtained using the first type of shared parameter list or the second type of shared parameter list.

The first type of shared parameter list is when there is one shared parameter list, and all task engines in the human-computer interaction system share the shared parameter list, that is, the foregoing multi-task parameter sharing management module stores only one shared parameter list.

In an example of this application, for the first type of shared parameter list, the first type of shared parameter list may include a correspondence between the first task engine and one or more task engines, a correspondence between slots included in any two task engines that have a correspondence, and a correspondence between a second slot and the target key information. The one or more task engines include the second task engine. For the first type of shared parameter list, the following manner may be used to obtain the target key information.

The second task engine is determined based on the correspondence between the first task engine and the one or more task engines.

Optionally, the second task engine may be configured to be responsible for second request information of the user, where the second request information and the first request information may occur within a preset time, and the second request information and the first request information occur within a preset quantity of dialogue rounds.

The second slot that has a correspondence with a first slot of the first task engine is determined, based on the correspondence between slots, from slots that are included in the second task engine and that are included in the shared parameter list.

The target key information is determined based on the correspondence between the second slot and the target key information.

In this example, three correspondences may be stored in the first type of shared parameter list a correspondence between different task engines, a correspondence between slots included in two task engines having a correspondence, and a correspondence between slots included in each task engine and target key information.

Figure 5:
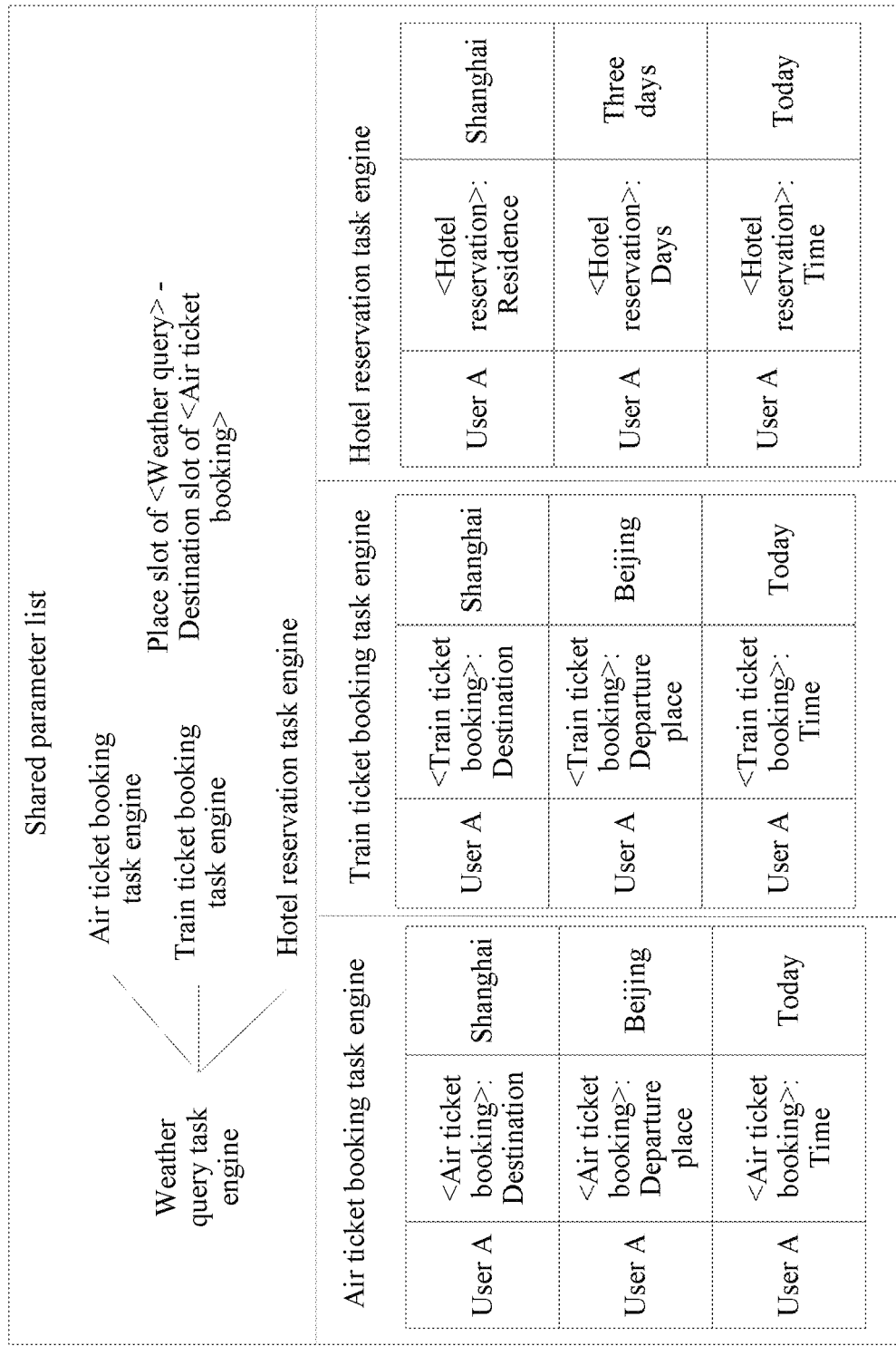
FIG. 5 is a schematic diagram of a shared parameter list according to this application.

For example, as shown in FIG. 1, a weather query task engine is used as an example, and a process of obtaining target key information may be as follows. First, task engines that interact with the user within a preset time (for example, 10 minutes) and a preset quantity of dialogue rounds (for example, five rounds of dialogue, where a process of one round of dialogue includes that the user enters a piece of request information and the human-computer interaction system feeds back a piece of information) are obtained. For example, the task engines that interact with the user may include {an air ticket booking task engine, a takeaway ordering task engine}. Then, task engines that have a correspondence with the weather query task engine in the shared parameter list are obtained, and may be, for example, {the air ticket booking task engine, a train ticket booking task engine, a hotel reservation task engine}. An intersection set of the two sets is obtained, that is, the intersection set of {the air ticket booking task engine, the takeaway ordering task engine} and {the air ticket booking task engine, the train ticket booking task engine, the hotel reservation task engine} is obtained. It can be learned that the intersection set of the two is {the air ticket booking task engine}. Then, in slots of the air ticket booking task engine, a slot corresponding to a place slot of the weather query task engine is searched for. It can be learned from FIG. 5 that the slot corresponding to the place slot of the weather query task engine is a destination slot of the air ticket booking task engine. Finally, target key information corresponding to the destination slot, that is, Shanghai, is used as key information of the place slot of the weather query task engine.

In another example of this application, for the first type of shared parameter list, the first type of shared parameter list may include a correspondence between a second slot and target key information. For the first type of shared parameter list, the following manner may be used to determine the target key information determining, using a context parameter of the user, the second task engine that is adjacent to the first task engine in terms of time, where the second task engine is configured to be responsible for second request information of the user, a slot having the same type as the first slot is set in the second task engine, and the adjacency of time means that an occurrence time of the second request information is adjacent to an occurrence time of the first request information, determining, from slots of the second task engine, the second slot having the same type as the first slot, and determining the target key information based on the correspondence between the second slot and the target key information.

It should be noted that, in this example of this application, that the first task engine is adjacent to the second task engine in terms of time may include the following two cases. In a first case, the first task request for which the first task engine is responsible and the second task request for which the second task engine is responsible are adjacent in terms of time, in other words, the first task request entered by the user is adjacent to the second task request in terms of time. For example, the user first enters, in the human-computer interaction system, the first task request of "booking an air ticket from Beijing to Shanghai", and then enters, in the human-computer interaction system, the second task request "How is the weather over there". It may be considered that the first task request and the second task request are adjacent in terms of time. In addition, it is set that the "air ticket booking" task engine is responsible for the "first task request", and the "weather query" task engine is responsible for the "second task request", and in this case, it may be determined that the "air ticket booking" task engine is adjacent to the "weather query" task engine in terms of time. In a second case, the first task request for which the first task engine is responsible and the second task request for which the second task engine is responsible are separated by a preset time in terms of time, and both are within a preset quantity of dialogue rounds.

In this example, only one correspondence is stored in the entire shared parameter list, that is, a correspondence between a slot of each task engine and key information.

Filling of the place slot of the weather query task engine is still used as an example for description. A process of obtaining the target key information may be as follows. First, in the context parameter of the user, a task engine adjacent to the weather query task engine is obtained, that is, a task engine that interacts with the user before the user interacts with the weather query task engine. For example, as shown in FIG. 6, the task engine adjacent to the weather query task engine in terms of time is an air ticket booking task engine. Then, slots of the air ticket booking task engine are searched for a slot with the same slot type as the place slot. For example, the found slot with the same type is a destination slot. Finally, key information, namely Shanghai, corresponding to the destination slot of the air ticket booking task engine in the shared parameter list is used as key information corresponding to the place slot in a weather query field.

The second type of shared parameter list is when there are a plurality of shared parameter lists, and each task engine exclusively occupies one shared parameter list. For example, the entire human-computer interaction system includes N task engines. In this case, the multi-task parameter sharing management module may store N shared parameter lists, and each task engine in the N task engines exclusively occupies one shared parameter list in the N shared parameter lists.

For the second type of shared parameter list, a correspondence between a second slot and the target key information may be stored in the shared parameter list. The target key information may be obtained in the following specific manner obtaining the first task engine corresponding to the first request information, obtaining the second task engine, where the second task engine corresponds to a second vertical field, the first task engine corresponds to a first vertical field, a correlation between the first vertical field and the second vertical field is greater than a preset threshold, and the correlation between the first vertical field and the second vertical field is obtained by clustering historical data, searching a shared parameter list exclusively occupied by the second task engine for a slot that has the same slot type as the first slot, and using the slot as the second slot, and determining the target key information based on the correspondence between the second slot and the target key information.

In an example of this application, for example, a shared parameter list maintained by an air ticket booking task engine may be shown in FIG. 7.

In this embodiment of this application, the shared parameter list may be generated based on a historical dialogue parameter between a user and the human-computer interaction system. For example, the user enters request information of "booking an air ticket from Beijing to Shanghai today" to the human-computer interaction system. In this case, the air ticket booking task engine may separately extract, from the request information, key information "Beijing" corresponding to a "departure place slot", key information "Shanghai" corresponding to a "destination slot", and key information "today" corresponding to a "time slot". Finally, the shared parameter list exclusively occupied by the air ticket booking task engine is updated based on the key information corresponding to different slots.

In this embodiment of this application, the foregoing example is still used. The user first enters, in the human-computer interaction system, the request information of "booking an air ticket from Beijing to Shanghai today", and the foregoing shared parameter list shown in FIG. 7 is generated. Then the user enters request information "How is the weather over there" in the human-computer interaction system, and it can be found that the request information should be handled by the weather query task engine. Then the weather query task engine may separately extract key information corresponding to the "place slot" and the "time slot" from the request information entered by the user. It can be found that the key information "over there" extracted for the "place slot" is demonstrative information, and the key information for the "time slot" fails to be extracted, that is, information is absent for the "time slot". In this embodiment of this application, it can be set that neither "information absence" nor the "demonstrative information" meets a condition. In this case, the following manner may be used to obtain the target key information obtaining a first vertical field corresponding to the weather query task engine, obtaining a second vertical field whose correlation with the first vertical field is greater than a preset threshold, where the correlation between the first vertical field and the second vertical field may be obtained by clustering historical data, obtaining a second task engine corresponding to the second vertical field, and obtaining the target key information from a shared parameter list exclusively occupied by the second task engine.

In this application, the second task engine may be set as an air ticket booking task engine. In this case, key information that meets a condition may be obtained in the foregoing shared parameter list shown in FIG. 7.

For example, in an example of this application, the shared parameter list shown in FIG. 7 may be searched for the key information that meets the condition and that corresponds to the "place slot" in the weather task engine. It may be learned from the FIG. 7 that "Shanghai" is the key information that meets the condition and that corresponds to the "place slot" in the weather query task engine. Similarly, the shared parameter list shown in FIG. 7 may be searched for the key information corresponding to the "time slot" of the weather task engine. It may be learned from the FIG. 7 that "today" is the key information that meets the condition and that corresponds to the "time slot" in the weather query task engine.

It may be learned from the foregoing analysis that the correspondence between the second slot and the target key information is stored in both the first shared parameter list and the second shared parameter list. In this embodiment of this application, the key information corresponding to the second slot is unique and updatable.

In an example of this application, the key information corresponding to the second slot may be updated in the following manner. The server receives third request information entered by the user, where the second task engine is responsible for the third request information, the server extracts, from the third request information, key information corresponding to the second slot of the second task engine, the server updates, based on the key information corresponding to the second slot that is extracted from the third request information, the target key information corresponding to the second slot in the correspondence between the second slot and the target key information included in the shared parameter list.

Figure 8A:
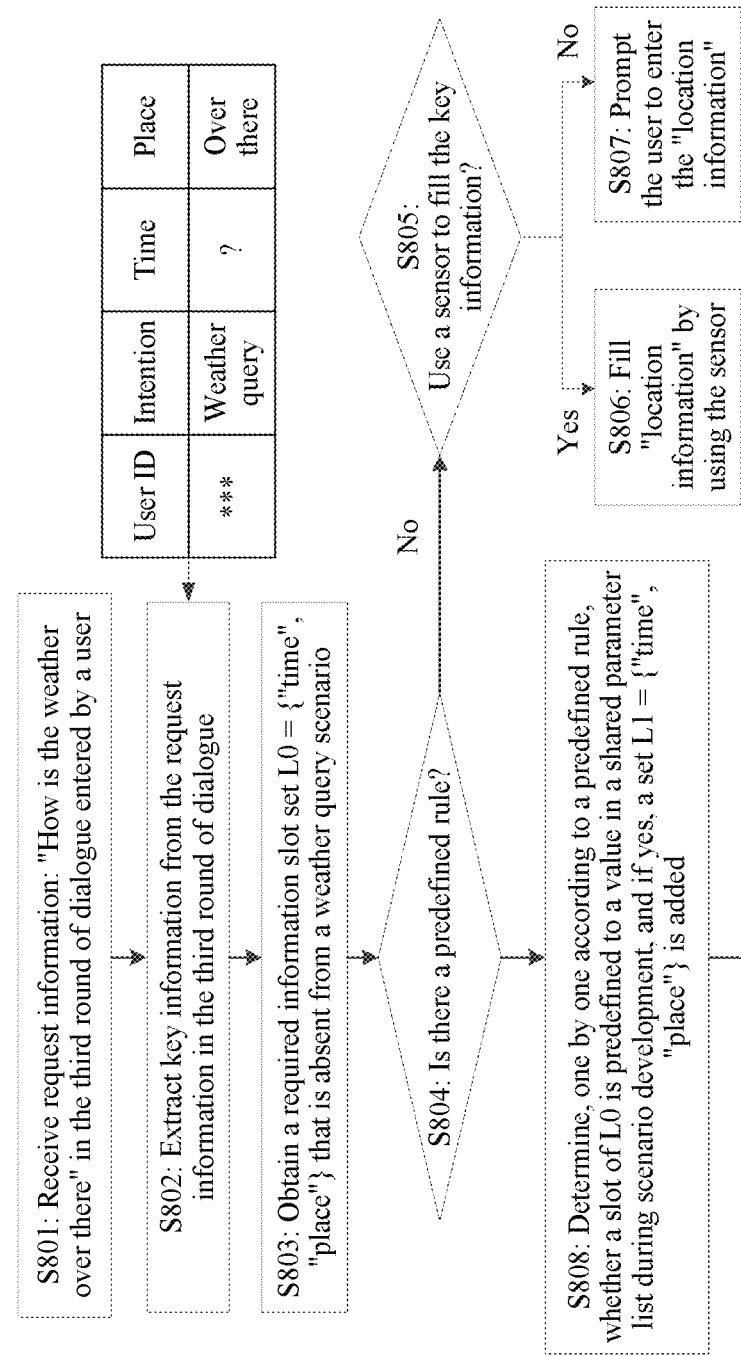
FIG. 8A shows still another information processing procedure according to this application.
Figure 8B:
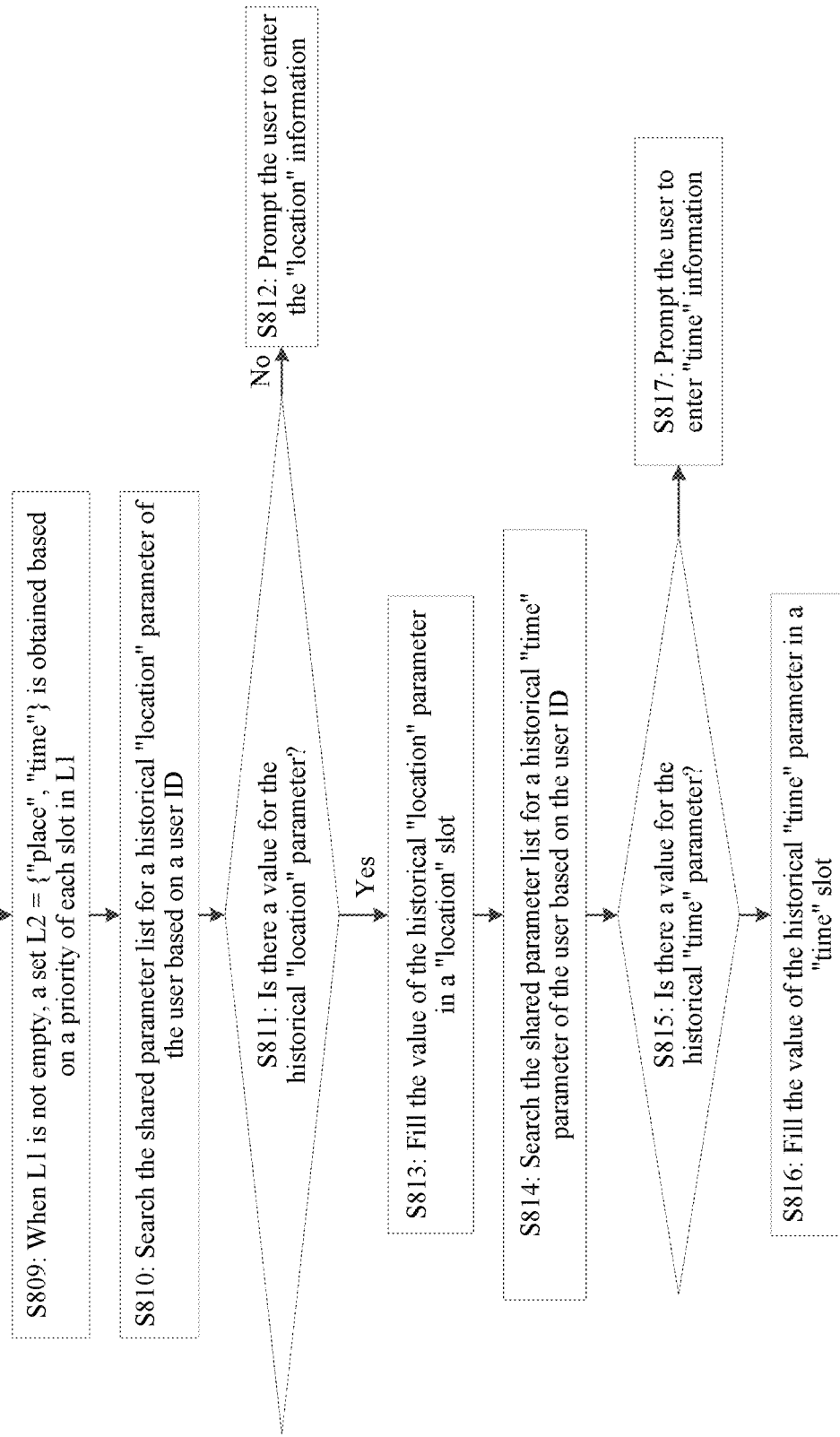
FIG. 8B shows still another information processing procedure according to this application.

For the first type of shared parameter list and the second type of shared parameter list, as shown in FIG. 8A and FIG. 8B, this application provides another information processing procedure, and the procedure includes the following steps.

In the procedure shown in FIG. 8A and FIG. 8B, three rounds of dialogue between a user and a human-computer interaction system are used as an example for detailed description.

The first round of dialogue is when the user enters request information "How is the weather in Beijing today" to the human-computer interaction system. The human-computer interaction system may perform intention identification on the request information entered by the user, and determine that the request information should be handled by the weather query task engine. For a place slot of the weather query task engine, key information "Beijing" may be extracted from the request information. For a time slot of the weather query task engine, key information "today" may be extracted from the request information. Finally, a historical parameter list is generated, as shown in Table 1.

TABLE 1

| User identification (ID) | Intention | Time | Place |
| --- | --- | --- | --- |
| *** | Weather query | Today | Beijing |

The second round of dialogue is when the user continues to enter request information of "booking an air ticket from Beijing to Buenos Aires tomorrow" to the human-computer interaction system. Similarly, the human-computer interaction system may perform intention identification on the request information of the user, and determine that the request information should be handled by an air ticket booking task engine. Then, the air ticket booking task engine may separately extract, from the request information, key information "Beijing" corresponding to a "departure place slot", key information "Buenos Aires" corresponding to a "destination slot", and key information "tomorrow" corresponding to a time slot. Finally, a historical parameter list is generated, as shown in Table 2.

TABLE 2

| User ID | Intention | Departure place | Destination | Time |
| --- | --- | --- | --- | --- |
| *** | Air ticket booking | Beijing | Buenos Aires | Tomorrow |

In this embodiment of this application, the historical parameter list shown in Table 1 and the historical parameter list shown in Table 2 may be stored in the first type of shared parameter list, or may be stored in the second type of shared parameter list. If the historical parameter lists are stored in the second type shared parameter list, the historical parameter list shown in Table 1 may be a shared parameter list exclusively occupied by the weather query task engine, and the historical parameter list shown in Table 2 may be a shared parameter list exclusively occupied by the air ticket booking task engine.

The third round of dialogue is when the user enters request information "How is the weather over there" to the human-computer interaction system.

Step S801. Receive request information "How is the weather over there" in the third round of dialogue entered by a user.

Step S802. Extract key information from the request information in the third round of dialogue.

For the extracted key information, refer to Table 3.

TABLE 3

| User ID | Intention | Time | Place |
| --- | --- | --- | --- |
| *** | Weather query | ? | Over there |

Step S803. Obtain a required information slot set L0={"time", "place"} that is absent from a weather query scenario.

Optionally, after step S803, the method may further include step S804, step S805, step S806, and step S807.

Step S804. Determine whether a predefined rule exists in filling of the information slot, and if the predefined rule does not exist, step S805 is performed, or if the predefined rule exists, step S808 is performed.

The predefined rule refers to whether a shared parameter list can be used to fill the information slot.

Step S805. Determine whether a sensor can be used to fill the key information in the absent information slot, and if the sensor can be used, step S806 is performed, or if the sensor cannot be used, step S807 is performed.

Step S806. Fill "location information" using the sensor.

Step S807. Prompt the user to enter the "location information".

In this embodiment of this application, step S804 to step S807 is to provide different manners of filling the information slot. For example, a shared parameter list manner may be used, a sensor manner may be used, or a manually entering manner by the user may be used.

In this embodiment of this application, alternatively, step S808 may be directly performed after step S803, that is, the key information of the information slot is directly filled in the shared parameter list manner.

Step S808. Determine, one by one according to a predefined rule, whether the slot of L0 is predefined to a value in a shared parameter list during scenario development, and if the slot of L0 is predefined to a value, a set L1={ "time", "place"} is added.

Step S809. When L1 is not empty, a set L2={"place", "time"} is obtained based on a priority of each slot in L1.

Step S810. Search the shared parameter list for a historical "location" parameter of the user based on a user ID.

Step S811. Determine whether there is a value for the historical "location" parameter, and if the value does not exist, step S812 is performed, or if the value exists, step S813 is performed.

Step S812. Prompt the user to enter the "location" information.

Step S813. Fill the value of the historical "location" parameter in a "location" slot.

In this embodiment of this application, the "destination: Buenos Aires" shown in Table 2 may be filled in the "location" slot to generate key information shown in Table 4.

TABLE 4

| User ID | Intention | Time | Place |
|---|---|---|---|
| *** | Weather query | ? | Buenos Aires |

Step S814. Search the shared parameter list for a historical "time" parameter of the user based on the user ID.

Step S815. Determine whether there is a value for the historical "time" parameter, and if the value exists, perform step S816, or if the value does not exist, perform step S817.

Step S816. Fill the value of the historical "time" parameter in a "time" slot.

In this embodiment of this application, the "time: Tomorrow" shown in Table 2 may be filled in the time slot to generate key information shown in Table 5.

TABLE 5

| User ID | Intention | Time | Place |
|---|---|---|---|
| *** | Weather query | Tomorrow | Buenos Aires |

Step S817. Prompt the user to enter "time" information.

In the foregoing manner, it may be learned that in this embodiment of this application, when the key information that meets the condition fails to be extracted from the request information entered by the user, the historical dialogue parameter of the user can be used to obtain the key information that meets the condition. In this way, the user does not need to enter request information again, user experience is relatively good, and human-computer interaction efficiency is relatively high.

Figure 9:
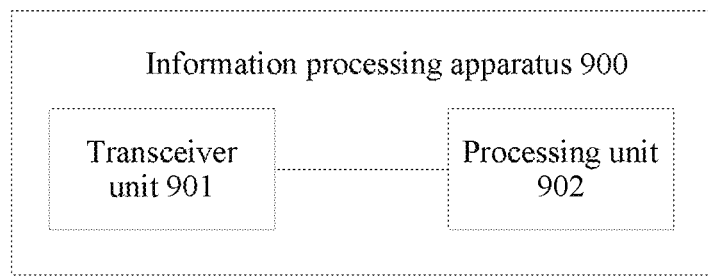
FIG. 9 is a structural diagram of a communications apparatus according to this application.

Based on the same concept, as shown in FIG. 9, this application provides an information processing apparatus 900. The information processing apparatus 900 may be a terminal device, a server, or the like, and includes a transceiver unit 901 and a processing unit 902.

The transceiver unit 901 is configured to receive first request information entered by a user.

It should be noted that the transceiver unit 901 may be a hardware apparatus such as a transceiver, or may be a logical unit such as a data interface. This is not limited in this application.

The processing unit 902 is configured to perform intention identification on the first request information, and determine a first task engine responsible for the first request information, where a first slot is set in the first task engine, extract key information from the first request information based on the first slot, and if the key information fails to be extracted from the first request information based on the first slot, or if the key information is extracted from the first request information based on the first slot, but the extracted key information does not meet a condition, obtain target key information from a shared parameter list of the user.

The shared parameter list includes at least a correspondence between a second slot and the target key information, the second slot and the first slot have a same slot type, the second slot is a slot in the second task engine, and the first task engine is different from the second task engine.

For specific descriptions of the transceiver unit 901 and the processing unit 902, refer to the description of the foregoing information processing method shown in FIG. 3. Details are not described herein again.

Figure 10:
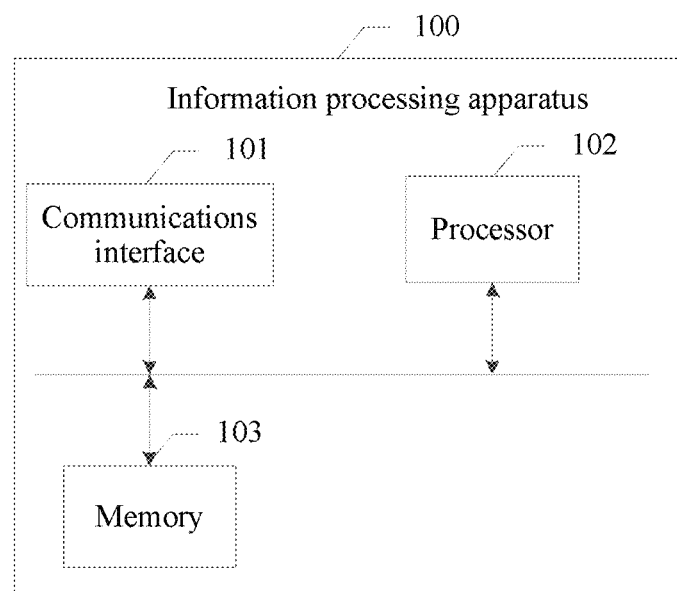
FIG. 10 is another structural diagram of a communications apparatus according to this application.

Based on the same concept, as shown in FIG. 10, an embodiment of this application further provides a structure of an information processing apparatus 100. The information processing apparatus 100 may be a terminal device or a server. Optionally, the information processing apparatus 100 may be a central control module in the server, or a function of the information processing apparatus 100 is implemented by the central control module in the server. Further, optionally, the information processing apparatus 100 may be a central control module in the terminal device, or a function of the information processing apparatus 100 is implemented by the central control module in the terminal device. As shown in FIG. 10, the information processing apparatus 100 may include a communications interface 101 and a processor 102. The information processing apparatus 100 may further include a memory 103. The memory 103 may be set inside the information processing apparatus 100, or may be set outside the information processing apparatus. The processing unit 902 shown in FIG. 9 may be implemented by the processor 102. The transceiver unit 901 may be implemented by the communications interface 101. The processor 102 receives service data using the communications interface 101.

In this embodiment of this application, the communications interface 101 may be a circuit, a bus, a transceiver, or any other apparatus that can be configured to perform information exchange.

In this embodiment of this application, the processor 102 may be a general purpose processor, a digital signal processor, an application-specific integrated circuit, a field programmable gate array or another programmable logic device, a discrete gate or transistor logic device, or a discrete hardware component, and may implement or perform the information processing method that is shown in FIG. 3, FIG. 4A and FIG. 4B, or FIG. 8A and FIG. 8B and that is disclosed in the embodiments of this application. The general purpose processor may be a microprocessor or any conventional processor or the like. The steps of the method disclosed with reference to the embodiments of this application may be directly performed by a hardware processor, or may be performed using a combination of hardware in the processor and a software unit. Program code used by the processor 102 to implement the foregoing method may be stored in the memory 103. The memory 103 is coupled to the processor 102. The processor 102 may operate in cooperation with the memory 103. The memory 103 may be a non-volatile memory such as a hard disk drive (HDD) or a solid-state drive (SSD), or may be a volatile memory such as a random-access memory (RAM). The memory 103 is any other medium capable of carrying or storing expected program code in a form of an instruction or a data structure and capable of being accessed by a computer. However, this is not limited thereto.

In this embodiment of this application, a specific connection medium between the communications interface 101, the processor 102, and the memory 103 is not limited. In this embodiment of this application, the memory 103, the processor 102, and the communications interface 101 are connected by a bus in FIG. 10. In FIG. 10, the bus is indicated by a thick line. The foregoing is merely an example for description. Manners of a connection between other components are not limited thereto. The bus may be classified into an address bus, a data bus, a control bus, and the like. For ease of representation, only one thick line is used to represent the bus in FIG. 10, but this does not mean that there is only one bus or only one type of bus.

Based on the foregoing embodiments, an embodiment of this application further provides a computer storage medium. The storage medium stores a software program, and when being read and executed by one or more processors, the software program can implement the method provided in any one or more of the foregoing embodiments. The computer storage medium may include any medium that can store program code, such as a Universal Serial Bus (USB) flash drive, a removable hard disk, a read-only memory, a random access memory, a magnetic disk, or an optical disc.

Based on the foregoing embodiments, this application provides a computer program, where the computer program includes a computer instruction, and when the computer instruction is executed by a computer, the computer is enabled to perform the method provided in any one or more of the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read-only memory (CD-ROM), and an optical memory) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Apparently, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method implemented by an electronic device, wherein the method comprises:
receiving first request information from a first user, wherein the first request information comprises target key information;
storing the target key information in a shared parameter list in a non-transitory computer-readable storage memory of the electronic device, wherein the shared parameter list comprises first identifiers of first task engines, second identifiers of second users of the first task engines, third identifiers of slots, and a plurality of first parameters corresponding to each of the first task engines, wherein each of the slots comprises one of the first identifiers of the first task engines and a corresponding one of a plurality of slot types, wherein the plurality of slot types comprises a time type, a location type, a behavior type, and a character type, wherein the plurality of first parameters comprises the target key information, wherein the shared parameter list comprises a plurality of rows of entries, wherein a first one of the plurality of rows of entries comprises a first user identifier, a first one of the slots corresponding to the time type, and a time value corresponding to the first one of the slots, wherein a second one of the plurality of rows of entries comprises a second user identifier, a second one of the slots corresponding to the location type, and a location value corresponding to the second one of the slots, wherein a third one of the plurality of rows of entries comprises a third user identifier, a third one of the slots corresponding to the behavior type, and a behavior value corresponding to the third one of the slots, and wherein a fourth one of the plurality of rows of entries comprises a fourth user identifier, a fourth one of the slots corresponding to the character type, and a character value corresponding to the fourth one of the slots;
receiving second request information from the first user, wherein the second request information corresponds to completing a computing task, wherein the second request information comprises intent information and key information, and wherein the second request information is received at a first time;
identifying, based on the intent information, from the first task engines, and by one or more processors of the electronic device, a second task engine for the second request information, wherein a first slot is set in the second task engine, and wherein the first slot corresponds to one of the plurality of slot types;
obtaining, based on an intersection of the first task engines and third task engines that have been used within a preset time of the first time of receiving the second request information, a subset of the first task engines;
obtaining, based on the subset of the first task engines, the first user, and the one of the plurality of slot types, the target key information from the shared parameter list in the non-transitory computer-readable storage memory of the electronic device when the target key information is not extracted from the second request information based on the first slot or when the key information is extracted from the second request information based on the first slot and the key information does not meet a condition, wherein the shared parameter list comprises a first correspondence between a second slot and the target key information, wherein the second slot and the first slot have the same slot type, wherein the second slot is in a fourth task engine from the first task engines, and wherein the second task engine is different from the fourth task engine; and executing, in response to receiving the second request information and by the one or more processors of the electronic device, the computing task using the target key information from the shared parameter list and not from the second request information.

2. The method of claim 1, wherein the shared parameter list further comprises a second correspondence between the second task engine and one or more of the first task engines and a third correspondence between slots comprised in any two corresponding task engines, wherein the one or more of the first task engines comprise the fourth task engine, and wherein the method further comprises:

identifying the fourth task engine based on the second correspondence;

identifying the second slot comprising a fourth correspondence with the first slot of the second task engine based on the third correspondence and from slots that are in the fourth task engine and the shared parameter list; and obtaining the target key information based on the first correspondence.

3. The method of claim 1, wherein the shared parameter list is exclusively occupied by the fourth task engine, and wherein obtaining the target key information from the shared parameter list comprises:

identifying the fourth task engine based on a correlation between the second task engine and the fourth task engine, wherein the correlation between the second task engine and the fourth task engine is greater than a preset threshold;

identifying the shared parameter list exclusively occupied by the fourth task engine based on the fourth task engine;

searching the shared parameter list for a third slot that has the same slot type as the first slot;

using the third slot as the second slot; and obtaining the target key information based on the first correspondence.

4. The method of claim 1, wherein the key information that does not meet the condition comprises demonstrative information.

5. The method of claim 1, wherein the target key information of the second slot is unique.

6. The method of claim 1, further comprising:

receiving third request information from the first user, wherein the fourth task engine is configured for the third request information;

extracting key information of the second slot of the fourth task engine from the third request information; and updating the target key information of the second slot in the first correspondence comprised in the shared parameter list based on the key information of the second slot.

7. The method of claim 1, wherein before extracting the key information from the second request information, the method further comprises:

obtaining a plurality of slots set in the second task engine, wherein the slots have priority information; and identifying the first slot based on the priority information.

8. The method of claim 1, wherein the first request information is received in a first dialogue round, wherein the second request information is received in a second dialogue round, and wherein obtaining the target key information further comprises obtaining, based on the second request information being within a preset quantity of dialogue rounds of the first request information, the target key information.

9. The method of claim 1, wherein obtaining the target key information further comprises obtaining, based on clustering historical data, the target key information.

10. The method of claim 1, wherein the first request information has a first occurrence time, wherein the second request information has a second occurrence time, and wherein the second occurrence time is adjacent to the first occurrence time.

11. The method of claim 1, wherein the plurality of first parameters corresponding to each of the first task engines comprises a name of a city, a date, and a number of days.

12. The method of claim 1, wherein the first task engines comprise an air ticket booking task engine, a train ticket booking task engine, and a hotel reservation task engine.

13. An electronic device, comprising:

a non-transitory computer-readable storage memory configured to store instructions; and one or more processors coupled to the non-transitory computer-readable storage memory and configured to execute the instructions to cause the electronic device to:

receive first request information from a first user, wherein the first request information comprises target key information;

store the target key information in a shared parameter list in the non-transitory computer-readable storage memory, wherein the shared parameter list comprises first identifiers of first task engines, second identifiers of second users of the first task engines, third identifiers of slots, and a plurality of first parameters corresponding to each of the first task engines, wherein each of the slots comprises one of the first identifiers of the first task engines and a corresponding one of a plurality of slot types, wherein the plurality of slot types comprises a time type, a location type, a behavior type, and a character type, wherein the plurality of first parameters comprises the target key information, wherein the shared parameter list comprises a plurality of rows of entries, wherein a first one of the plurality of rows of entries comprises a first user identifier, a first one of the slots corresponding to the time type, and a time value corresponding to the first one of the slots, wherein a second one of the plurality of rows of entries comprises a second user identifier, a second one of the slots corresponding to the location type, and a location value corresponding to the second one of the slots, wherein a third one of the plurality of rows of entries comprises a third user identifier, a third one of the slots corresponding to the behavior type, and a behavior value corresponding to the third one of the slots, and wherein a fourth one of the plurality of rows of entries comprises a fourth user identifier, a fourth one of the slots corresponding to the character type, and a character value corresponding to the fourth one of the slots;

receive second request information from the first user, wherein the second request information corresponds to completing a computing task, wherein the second request information comprises intent information and key information, and wherein the second request information is received at a first time;

identify, based on the intent information, from the first task engines, and by the one or more processors, a second task engine for the second request information, wherein a first slot is set in the second task engine, and wherein the first slot corresponds to one of the plurality of slot types;

obtain, based on an intersection of the first task engines and third task engines that have been used within a preset time of the first time of receiving the second request information, a subset of the first task engines;

obtain, based on the subset of the first task engines, the first user, and the one of the plurality of slot types, the target key information from the shared parameter list in the non-transitory computer-readable storage memory of the electronic device when the target key information is not extracted from the second request information based on the first slot or when the key information is extracted from the second request information based on the first slot and the key information does not meet a condition, wherein the shared parameter list comprises at least a first correspondence between a second slot and the target key information, wherein the second slot and the first slot have the same slot type, wherein the second slot is in a fourth task engine from the first task engines, and wherein the second task engine is different from the fourth task engine; and execute, in response to receiving the second request information and by the one or more processors, the computing task using the target key information from the shared parameter list and not from the second request information.

14. The electronic device of claim 13, wherein the shared parameter list further comprises a second correspondence between the second task engine and one or more of the first task engines and a third correspondence between slots comprised in any two corresponding task engines, wherein the one or more of the first task engines comprise the fourth task engine, and wherein the instructions further cause the electronic device to:
identify the fourth task engine based on the second correspondence;
identify the second slot comprising a fourth correspondence with the first slot of the second task engine based on the third correspondence and from slots that are in the fourth task engine and the shared parameter list; and
obtain the target key information based on the first correspondence.

15. The electronic device of claim 13, wherein the shared parameter list is exclusively occupied by the fourth task engine, and wherein when obtaining the target key information from the shared parameter list of the first user, the instructions further cause the electronic device to:
identify the fourth task engine based on a correlation between the second task engine and the fourth task engine, wherein the correlation between the second task engine and the fourth task engine is greater than a preset threshold;
identify the shared parameter list exclusively occupied by the fourth task engine based on the fourth task engine;
search the shared parameter list for a third slot that has the same slot type as the first slot;
use the third slot as the second slot; and
obtain the target key information based on the first correspondence.

16. The electronic device of claim 13, wherein the key information that does not meet the condition comprises demonstrative information.

17. The electronic device of claim 13, wherein the target key information of the second slot is unique.

18. The electronic device of claim 13, wherein the instructions further cause the electronic device to:
receive third request information from the first user, wherein the second task engine is configured for the third request information;
extract key information of the second slot of the second task engine from the third request information; and
update the target key information of the second slot in the first correspondence comprised in the shared parameter list based on the key information of the second slot.

19. The electronic device of claim 13, wherein the instructions further cause the electronic device to:
obtain a plurality of slots set in the second task engine, wherein the slots have priority information; and
identify the first slot based on the priority information.

20. A computer program product comprising computer-executable instructions stored on a non-transitory computer-readable medium that, when executed by one or more processors, cause an electronic device to:
receive first request information from a first user, wherein the first request information comprises target key information;
store the target key information in a shared parameter list in a non-transitory computer-readable storage memory of the electronic device, wherein the shared parameter list comprises first identifiers of first task engines, second identifiers of second users of the first task engines, third identifiers of slots, and a plurality of first parameters corresponding to each of the first task engines, wherein each of the slots comprises one of the first identifiers of the first task engines and a corresponding one of a plurality of slot types, wherein the plurality of slot types comprises a time type, a location type, a behavior type, and a character type, wherein the plurality of first parameters comprises the target key information, wherein the shared parameter list comprises a plurality of rows of entries, wherein a first one of the plurality of rows of entries comprises a first user identifier, a first one of the slots corresponding to the time type, and a time value corresponding to the first one of the slots, wherein a second one of the plurality of rows of entries comprises a second user identifier, a second one of the slots corresponding to the location type, and a location value corresponding to the second one of the slots, wherein a third one of the plurality of rows of entries comprises a third user identifier, a third one of the slots corresponding to the behavior type, and a behavior value corresponding to the third one of the slots, and wherein a fourth one of the plurality of rows of entries comprises a fourth user identifier, a fourth one of the slots corresponding to the character type, and a character value corresponding to the fourth one of the slots;
receive second request information from the first user, wherein the second request information corresponds to completing a computing task, wherein the second request information comprises intent information and key information, and wherein the second request information is received at a first time;
identify, based on the intent information from the first task engines, and by the one or more processors, a second task engine for the second request information, wherein a first slot is set in the second task engine, and wherein the first slot corresponds to one of the plurality of slot types;

obtain, based on an intersection of the first task engines and third task engines that have been used within a preset time of the first time of receiving the second request information, a subset of the first task engines;

obtain, based on the subset of the first task engines, the first user, and the one of the plurality of slot types, the target key information from the shared parameter list in the non-transitory computer-readable storage memory of the electronic device when the target key information is not extracted from the second request information based on the first slot or when the key information is extracted from the second request information based on the first slot and the key information does not meet a condition, wherein the shared parameter list comprises at least a first correspondence between a second slot and the target key information, wherein the second slot and the first slot have the same slot type, wherein the second slot is in a fourth task engine from the first task engines, and wherein the second task engine is different from the fourth task engine; and execute, in response to receiving the second request information and by the one or more processors of the electronic device, the computing task using the target key information from the shared parameter list and not from the second request information.

* * * * *